United States Patent
Rollins et al.

(10) Patent No.: US 9,325,416 B2
(45) Date of Patent: Apr. 26, 2016

(54) NETWORK INTERFACE DEVICE FOR OPTICAL PREMISES SIGNALS AND NETWORKS

(75) Inventors: William E. Rollins, Fremont, CA (US); Eric S. Forbes, Canton, GA (US); Arvind Ramdas Mallya, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 385 days.

(21) Appl. No.: 12/847,178

(22) Filed: Jul. 30, 2010

(65) Prior Publication Data

US 2012/0027416 A1    Feb. 2, 2012

(51) Int. Cl.
*H04J 14/00* (2006.01)
*H04B 10/272* (2013.01)
*H04B 10/2581* (2013.01)

(52) U.S. Cl.
CPC .......... *H04B 10/272* (2013.01); *H04B 10/2581* (2013.01)

(58) Field of Classification Search
CPC ..................... H04B 10/25753; H04B 10/1125; H04B 10/25752; H04B 10/25759; H04B 10/272; H04B 10/2581; H04B 10/27; H04B 10/40; H04Q 11/0071; H04J 14/02; H04L 12/66
USPC ............ 398/66–68, 70–72, 74, 175, 115–117
See application file for complete search history.

(56) References Cited

U.S. PATENT DOCUMENTS

| | | | |
|---|---|---|---|
| 5,592,477 A | 1/1997 | Farris et al. | |
| 5,630,204 A | 5/1997 | Hylton et al. | |
| 5,880,864 A | 3/1999 | Williams et al. | |
| 5,917,815 A * | 6/1999 | Byers et al. | 370/352 |
| 6,684,030 B1 * | 1/2004 | Taylor et al. | 398/59 |
| 6,690,682 B1 * | 2/2004 | Giaretta et al. | 370/535 |
| 6,895,185 B1 * | 5/2005 | Chung et al. | 398/72 |
| 7,010,233 B2 * | 3/2006 | Lindblad | 398/164 |
| 7,194,639 B2 | 3/2007 | Atkinson et al. | |
| 7,221,685 B2 | 5/2007 | Mallya | |
| 7,286,905 B2 | 10/2007 | Kimble et al. | |
| 7,296,938 B1 | 11/2007 | Shapson et al. | |
| 7,310,430 B1 | 12/2007 | Mallya et al. | |
| 7,433,362 B2 | 10/2008 | Mallya et al. | |
| 7,450,520 B2 * | 11/2008 | Bernier et al. | 370/246 |
| 7,472,189 B2 | 12/2008 | Mallya et al. | |
| 7,551,635 B2 | 6/2009 | Mallya et al. | |
| 7,567,550 B2 | 7/2009 | Henning et al. | |
| 7,627,399 B2 | 12/2009 | Kimble et al. | |

(Continued)

*Primary Examiner* — Hibret Woldekidan
(74) *Attorney, Agent, or Firm* — Jackson Walker L.L.P.

(57) ABSTRACT

A network interface device (NID) demarcates an access network and a premises network. The NID receives a broadband signal via an access network and transmits optical device signals to pieces of premises equipment. The broadband signal may be a single-mode fiber (SMF) optical signal transmitted over an SMF cable. In these embodiments, the NID may include a transponder including a first stage to convert the SMF signal to an intermediate electrical signal and a second stage to convert the intermediate electrical signal to a premises optical signal. In other embodiments, the broadband signal may be a very high bit rate digital subscriber line (VDSL) or other type of electrical signal and the NID's transponder may convert the VDSL signal to the premises optical signal. The NID may further include a multiplexer to multiplex the premises optical signal into the optical device signals for delivery to premises devices via corresponding premises device ports and plastic optical fiber cables.

20 Claims, 6 Drawing Sheets

(56) References Cited

U.S. PATENT DOCUMENTS

| | | | |
|---|---|---|---|
| 7,649,849 B2 | 1/2010 | Mallya | |
| 7,824,206 B1 | 11/2010 | Wilson et al. | |
| 7,848,731 B1 | 12/2010 | Dianda et al. | |
| 7,899,582 B2 | 3/2011 | Kimble et al. | |
| 7,903,980 B2 | 3/2011 | Villarruel | |
| 8,687,771 B2* | 4/2014 | Wang et al. | 379/1.04 |
| 8,762,520 B2* | 6/2014 | Beattie et al. | 709/224 |
| 8,963,573 B2* | 2/2015 | Achkir et al. | 324/756.02 |
| 9,020,487 B2* | 4/2015 | Brisebois et al. | 455/419 |
| 2001/0010586 A1* | 8/2001 | Furusawa et al. | 359/133 |
| 2002/0063924 A1* | 5/2002 | Kimbrough et al. | 359/125 |
| 2003/0081619 A1 | 5/2003 | Phillips et al. | |
| 2004/0004538 A1* | 1/2004 | Manis et al. | 340/310.01 |
| 2004/0114633 A1 | 6/2004 | Mallya | |
| 2004/0137839 A1* | 7/2004 | Lim et al. | 455/7 |
| 2004/0175173 A1 | 9/2004 | Deas | |
| 2006/0098578 A1 | 5/2006 | Mallya et al. | |
| 2006/0098642 A1 | 5/2006 | Mallya et al. | |
| 2006/0167805 A1 | 7/2006 | Manthoulis et al. | |
| 2006/0285807 A1* | 12/2006 | Lu et al. | 385/92 |
| 2007/0064880 A1 | 3/2007 | Mallya et al. | |
| 2007/0070917 A1 | 3/2007 | Mallya et al. | |
| 2007/0112470 A1 | 5/2007 | Kimble et al. | |
| 2007/0140305 A1 | 6/2007 | Mallya et al. | |
| 2007/0280610 A1 | 12/2007 | Mallya et al. | |
| 2008/0037941 A1 | 2/2008 | Mallya et al. | |
| 2008/0063399 A1* | 3/2008 | Mallya et al. | 398/75 |
| 2008/0124086 A1 | 5/2008 | Matthews | |
| 2008/0137835 A1 | 6/2008 | Kimble et al. | |
| 2009/0010657 A1* | 1/2009 | Kazutaka | 398/173 |
| 2009/0034984 A1 | 2/2009 | Mallya et al. | |
| 2009/0060530 A1 | 3/2009 | Biegert et al. | |
| 2009/0077257 A1 | 3/2009 | Savoor et al. | |
| 2009/0160662 A1 | 6/2009 | Shamilian | |
| 2009/0212971 A1* | 8/2009 | Casey et al. | 340/870.02 |
| 2009/0225672 A1 | 9/2009 | Yi et al. | |
| 2009/0297111 A1* | 12/2009 | Reagan et al. | 385/135 |
| 2010/0042264 A1 | 2/2010 | Kimble et al. | |
| 2010/0074139 A1 | 3/2010 | Mallya | |
| 2010/0074621 A1* | 3/2010 | Minato et al. | 398/77 |
| 2010/0115605 A1 | 5/2010 | Beattie et al. | |
| 2010/0146578 A1 | 6/2010 | Mallya et al. | |
| 2010/0150556 A1 | 6/2010 | Soto et al. | |
| 2010/0178058 A1* | 7/2010 | Kozischek et al. | 398/115 |
| 2011/0055884 A1 | 3/2011 | Beattie, Jr. et al. | |
| 2011/0103231 A1 | 5/2011 | Beattie, Jr. et al. | |
| 2011/0106588 A1 | 5/2011 | Beattie, Jr. et al. | |
| 2011/0110662 A1 | 5/2011 | Wellbrock et al. | |
| 2011/0116805 A1 | 5/2011 | Xia et al. | |
| 2011/0122246 A1 | 5/2011 | Beattie et al. | |
| 2011/0124216 A1 | 5/2011 | Wilson et al. | |
| 2011/0126241 A1 | 5/2011 | Beattie, Jr. et al. | |
| 2011/0134983 A1 | 6/2011 | Mallya et al. | |
| 2011/0239266 A1* | 9/2011 | Brooks | 725/146 |
| 2014/0233951 A1* | 8/2014 | Cook | 398/67 |
| 2014/0314412 A1* | 10/2014 | Soto et al. | 398/67 |

* cited by examiner

NETWORK INTERFACE DEVICE FOR OPTICAL PREMISES SIGNALS AND NETWORKS

FIELD OF THE DISCLOSURE

The present disclosure relates to communications networks and, more particularly, the delivery of voice, video, and data services over such networks.

BACKGROUND

Description of the Related Art

Communication networks used to deliver voice, video, and data, may employ fiber optic transmission media. In certain implementations, referred to herein as fiber-to-the-node or fiber-to-the-neighborhood (FTTN), the access network, also sometimes referred to as the "last mile" or local loop, includes a twisted pair copper medium. In other implementations, referred to herein as fiber-to-the-premises (FTTP), the optical medium extends to the premises. Typically, the service provider's access network and the subscriber's premises network meet and terminate at a network interface device (NID) affixed to or in close proximity to the subscriber premises. Conventionally, the subscriber's premises network is a variant of an Ethernet network.

DESCRIPTION OF THE EMBODIMENT(S)

Figure 1:
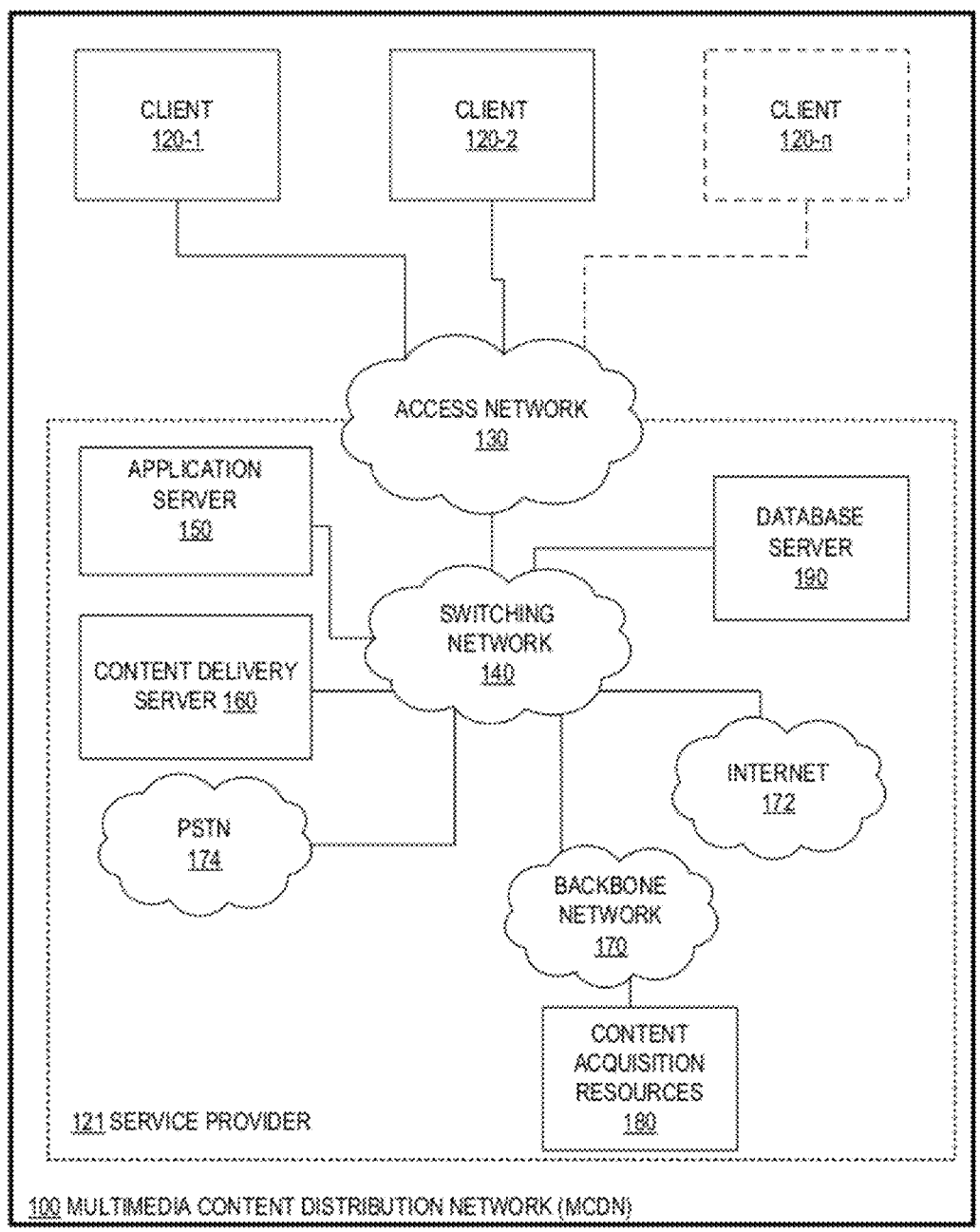
FIG. 1 is a block diagram of selected elements of an embodiment of a multimedia content distribution network.

In the implementation of a conventional NID on the side of the premises in a FTTN environment, an electrical broadband signal from the access network is conveyed with a CAT3 or CAT5 twisted pair into the premises, where the twisted pair connects to the residential gateway. When the residential gateway has limited noise filtering, which is generally the case, unfiltered noise may be carried to individual devices in the premises including, for example, telephones, computers, and set top boxes. In the case of set top boxes, pixilation and frozen video impairment may result. Additional noise can be transmitted to and impact communication services via treadmills, WiFi disturbance, baby monitors, pool sweeps, fish tank motors, arc welding equipment, defective compact fluorescent lights, and so forth.

A disclosed NID, suitable for installation at a subscriber premises, demarcates an access network and a subscriber premises network. The NID includes an access network interface and a premises network interface. The access network interface is configured to connect the NID to the access network and further configured to receive a broadband signal via the access network transmission medium. The premises network interface includes a plurality of premises interface ports. At least some of the premises interface ports are configured to transmit optical device signals to respective pieces of customer premises equipment (CPE).

In some embodiments, the broadband signal is a single-mode fiber (SMF) optical signal suitable for transmission over a single-mode optical fiber. In these embodiments, the SMF optical signal may be a 1310 nm SMF signal and the NID may further include a bidirectional transponder including a first stage configured to convert the SMF signal to an intermediate electrical signal and a second stage configured to convert the intermediate electrical signal to a premises optical signal. The NID may further include a de-multiplexer configured to de-multiplex the premises optical signal into the plurality of optical device signals for delivery to premises devices via corresponding premises device ports in the NID.

In some embodiments, the broadband signal is an electrical broadband signal such as a digital subscriber line (DSL) or very high bit rate DSL (VDSL) signal. In these embodiments, the NID may include a bidirectional transponder configured to convert the electrical broadband signal to a premises optical signal. The NID in these embodiments may also include a de-multiplexer configured to de-multiplex the premises optical signal into the plurality of optical device signals.

In some embodiments, the optical device signals are suitable for transmission via a plastic optical fiber (POF) to CPE devices such as set top boxes/televisions, telephones, computers, or a combination thereof. Plastic optical fiber POF (or Polymer optical fibre) is an optical fiber which is made out of plastic. Traditionally poly (methyl methacrylate) PMMA (acrylic) is the core material, and fluorinated polymers are the cladding material. Since the late 1990s however, much higher-performance POF based on perfluorinated polymers (mainly polyperfluorobutenylvinylether) has begun to appear in the marketplace. The optical device signals may be 650 nm signals suitable for transmission via a set of POFs.

The NID may still further include a battery backup unit configured to provide backup power for a predetermined duration in the event of an interruption of AC power to the premises.

In another aspect, a disclosed method of providing multimedia content to a plurality of subscribers includes receiving a broadband signal from an access network, converting the broadband signal to a premises optical signal, de-multiplexing the premises optical signal into a plurality of optical device signals, and communicating the optical device signals to corresponding premises devices.

In some embodiments of the disclosed methods, the broadband signal is a VDSL or other type of electrical signal while, in other embodiments, the broadband signal is an SMF optical signal or another type of optical signal. The premises optical signal and the optical device signals may consist of or include 650 nm wavelength signals suitable for transmission via a set of one or more POFs. In some embodiments, disclosed methods may further include first converting the SMF broadband signal to an intermediate electrical signal and, second, converting the intermediate electrical signal to the premises optical signal.

In another aspect, a disclosed NID is configured for placement at a subscriber premises to demarcate an access network and a premises network. The NID may be configured to receive a broadband signal from the access network and further configured to convert the broadband signal to a premises optical signal that includes a plurality of optical device signals. The broadband signal may be, e.g., an optical signal such as an SMF optical signal or an electrical signal such as a VDSL signal. The plurality of optical device signals may be 650 nm signals suitable for transmission over a POF.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of a multimedia content distribution network (MCDN) 100. The depicted embodiments of MCDN 100 are suitable for providing voice, video or multimedia, and data services to a plurality of subscribers. In this context video and/or multimedia services encompass the distribution of TV, video on demand (VOD), or pay-per-view (PPV) content or programs, which are interchangeably referred to herein as "multimedia content", "multimedia content programs", "multimedia programs" or, simply, "programs." Voice services encompass conventional telephone and telephony-based services including voice mail, caller ID, text messaging, and the like. Data services encompass services for providing access to the Internet, email services, and the like.

The elements of MCDN 100 illustrated in FIG. 1 depict network embodiments with functionality for delivering voice, video, and data services to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver voice, video, and data services to clients 120 via an access network 130. As depicted in FIG. 1, service provider 121 includes a switching network 140 providing access to Internet 172 to support data services, public switched telephone network (PSTN) 174 to support voice services, and multimedia content acquisition resources 180, via a backbone network 170, to support video or multimedia services. In addition, the depicted embodiment of service provider 121 includes an application server 150, a database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 may include various types of broadband transmission media including, as examples, optical fiber transmission media, twisted pair copper transmission media, and/or optical cable transmission media. It is noted that in some embodiments of MCDN 100, access network 130 is owned and/or operated by service provider 121. In other embodiments, a third party may own and/or operate at least a portion of access network 130. Similarly, service provider 121 may own or lease from a third party all or portions of backbone network 170 and switching network 140.

Access network 130 may include, in addition to physical transmission media, intermediate nodes (not depicted in FIG. 1) between clients 120 and service provider 121 to support access networks that employ different types of transmission media including, e.g., an access network 130 that employs optical fiber media for all but a last segment of the access network and twisted pair copper media or another broadband medium for the last segment. In other embodiments, the access network may employ a single type of transmission medium from service provider 121 all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSL access multiplexer (DSLAM) or Video Ready Access Device (VRAD) that multiplexes many subscriber DSLs to backbone network 170 (see also FIG. 4). Switching network 140 may also include media gateways to enable connection to PSTN 174 or other analog or digital telephone networks.

In FIG. 1, backbone network 170 represents a private network including, as an example, a fiber-based network to accommodate high data transfer rates. Content acquisition resources 180 as depicted in FIG. 1 encompass the acquisition of various types of content including broadcast content, other "live" content including national content feeds, and VOD content.

Acquired multimedia content is provided to content delivery server 160 via backbone network 170 and switching network 140. Multimedia content may be delivered from content delivery server 160 to clients 120 via switching network 140 and access network 130. Multimedia content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include geographically tiered content acquisition resources in regional offices that are connected to switching network 140 to provide, for example, local or regional programming content.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., electronic programming guides (EPGs), digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

In FIG. 1, Internet 172 represents access to web sites, web pages, and web applications that may be invoked using a universal resource locator (URL), such as an Internet web address. A web browser or similar application may be used to access a published website using an Internet user device (not shown in FIG. 1). In certain implementations, application server 150 and/or database server 190 may be configured to host web servers (not shown in FIG. 1) accessible via Internet 172, whereby the web servers provide functionality for publishing websites and managing various URLs related thereto. It is noted that websites published using MCDN 100 may provide controlled access based on an MCDN client account associated with individual client 120. Client-specific websites may thus enable client-specific information and/or communication channels to be made available by MCDN 100 via Internet 172. Internet 172 may further encompass access to other IP-based services such as email.

Figure 2:
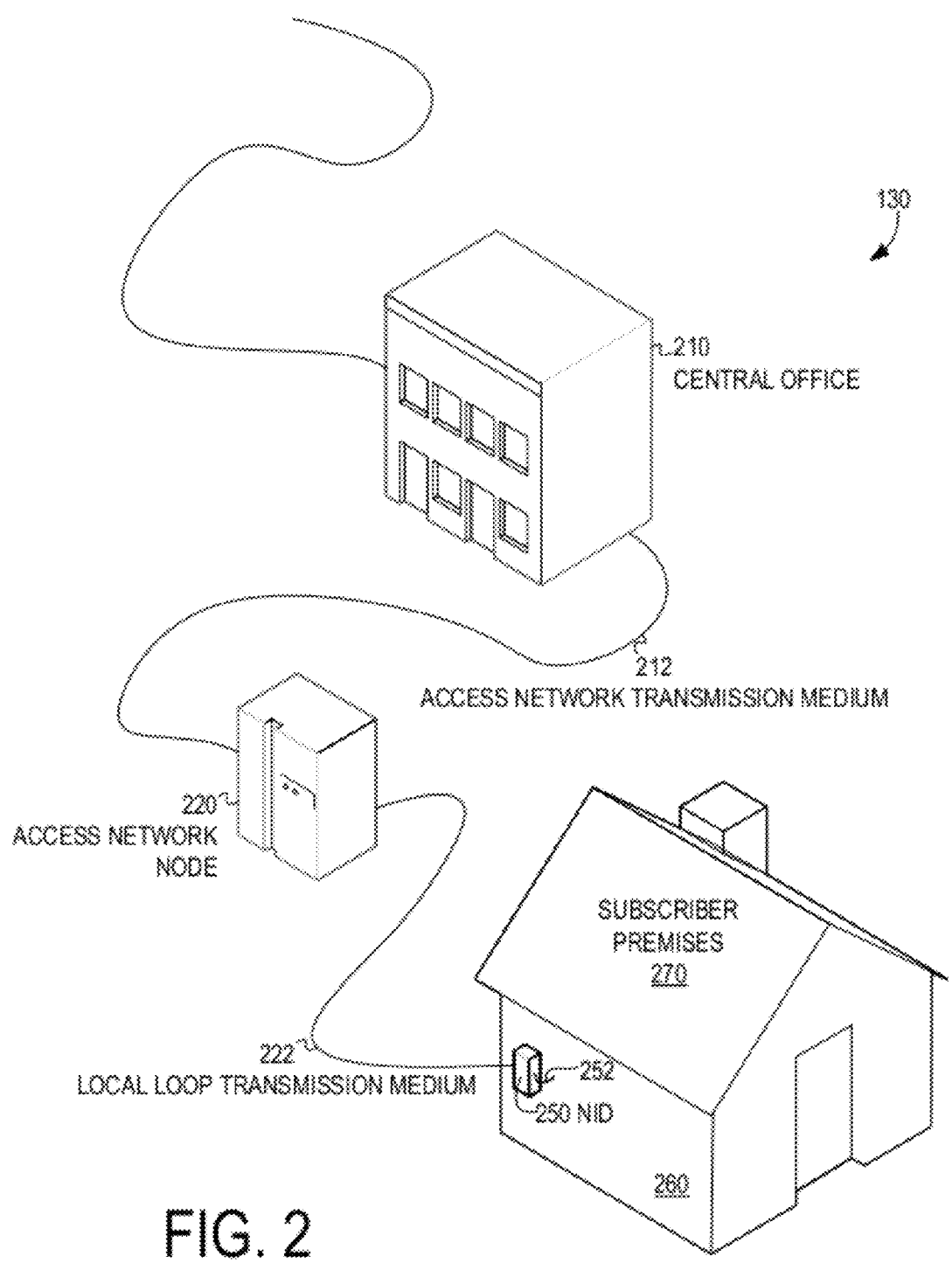
FIG. 2 depicts selected elements of the network depicted in FIG. 1 including a network interface device affixed to a subscriber premises.

Turning now to FIG. 2, selected elements of an implementation of MCDN 100 are depicted in greater detail. FIG. 2 depicts access network 130 as including a central office (CO) 210, an access network transmission medium (ANTM) 212, an access network node (ANN) 220, a local loop transmission medium (LLTM) 222, a NID 250 affixed to the outside of a wall or other structural element 260 of a subscriber premises (SP) 270, and a subscriber premises transmission medium (SPTM) 252. CO 210 represents a local or regional node in MCDN 100 that includes resources to connect the applicable locality or region to backbone network 170.

ANTM 212 represents one or more fiber optical cables connecting CO 210 to ANN 220, which serves as a neighborhood node in access network 130. A LLTM 222 is depicted connecting ANN 220 to NID 250 at SP 270. Thus, as depicted in FIG. 2, ANN 220 defines a boundary of the local loop. The permissible length of LLTM 222 may be constrained by signal attenuation, noise, and other signal transmission issues. It is not generally feasible in a locality or region of any substantial population to have separate CO facilities within local loop range of a majority of potential subscribers. The use of node devices such as ANN 220 enables the service provider to provide service to subscriber premises that are out of local loop range of CO 210.

The inclusion of ANN 220 in FIG. 2 does not preclude implementations in which LLTM 222 extends directly from CO 210 to SP 270 when SP 270 is sufficiently close to CO 210. In addition, although FIG. 2 depicts a single ANN 220 connected to CO 210 and a single SP 270 connected to ANN 220 for the sake of clarity, it will be readily appreciated to those of skill in the art that CO 210 may be connected to multiple ANNs 220 and that each ANN 220 may be connected to multiple SPs 270.

In some embodiments, ANTM 212 is an optical transmission medium that includes one or more optical fibers. ANTM 212 may, for example, employ an SMF. An SMF is an optical fiber designed to carry only a single ray of light, which is referred to as the mode. The mode may contain a variety of different wavelengths. In some embodiments, however, MCDN 100 and CO 210 are configured to communicate a mode having a wavelength of 1310 nm over ANTM 212. SMFs exhibit less modal dispersion than multi-mode fibers and thus retain the fidelity of each light pulse over longer distances than multi-mode fibers. SMFs can therefore operate at higher bandwidths than multi-mode fibers.

Depending upon the implementation, ANTM 212 may have a core diameter in the range of approximately 8 μm to approximately 10 μm, and a cladding diameter of approximately 125 μm. ANTM 212 may exhibit data rates exceeding 10 gigabits per second at distances over 50 miles. If optical amplifiers and dispersion-compensating devices are used, the data rate may be sustained for thousands of kilometers.

The implementation of ANN 220 is dependent upon the media used for LLTM 222. In an FTTP configuration, LLTM 222 may have the same or substantially similar characteristics as ANTM 212. If, for example, ANTM 212 employs an SMF using a 1310 nm signal, LLTM 222 may also include a 1310 nm SMF. In this case, ANN 220 may be configured as a 1×N splitter or 1×N de-multiplexer that communicates N respective 1310 nm signals over N SMF-implemented LLTMs 222 to N corresponding SPs 270. ANN 220 may represent or include a serving area interface that distributes service over a dual strand fiber, which is split into 32 customer fiber pairs. If LLTM 222 is a twisted pair copper media, ANN 220 may be implemented as a VRAD that converts the optical signal transmitted over ANTM 212 to an electrical signal transmitted over the copper-implemented LLTM 222. In some implementations, ANN 220 may service 200 to 400 SPs.

As depicted in FIG. 2, access network 130 and LLTM 222 terminate at NID 250 affixed to an outside wall 260 of SP 270. Although depicted in FIG. 2 as being located exterior to SP 270, other implementations may place NID 250 within an equipment room or garage of SP 270. FIG. 2 depicts SPTM 252 exiting NID 250 and entering SP 270 through wall 260.

Figure 3:
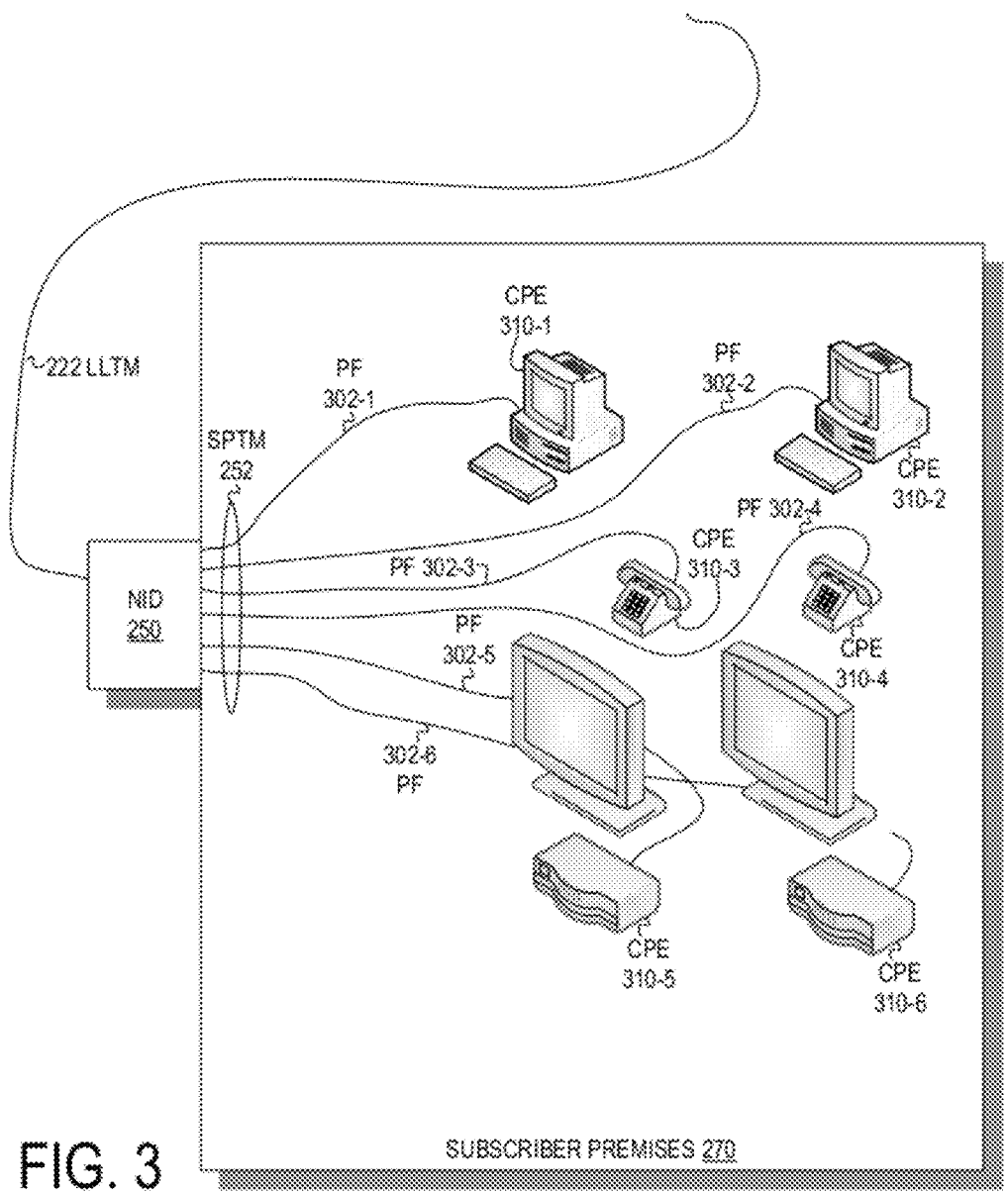
FIG. 3 depicts an embodiment of the network interface device of FIG. 2 and exemplary elements within the subscriber premises.

Referring now to FIG. 3, selected elements of an implementation of NID 250 and SP 270 are depicted. In the depicted embodiment, NID 250 provides an interface connecting LLTM 222 and CPE 310 within SP 270 via a plurality of premises fibers (PFs) 302, which collectively comprise the SPTM 252 depicted in FIG. 2. As depicted in the exemplary implementation of FIG. 3, for example, the CPE 310 in SP 270 includes computers and other devices 310-1 and 310-2 for receiving and transmitting data, telephones and other devices 310-3 and 310-4 for receiving and transmitting voice, and set top boxes and other devices 310-5 and 310-6 for receiving and transmitting distributed multimedia content including live and time-shifted television content, VOD content, PPV content, and the like. Other implementations may employ more or fewer pieces of CPE 310. Similarly, although FIG. 3 depicts desktop computers for CPE 310-1 and 310-2, other types of computers and data processing devices may be used. Likewise, although FIG. 3 depicts stand-alone set top boxes for CPE 310-5 and CPE 310-6 connected to stand-alone televisions or monitors, other embodiments may employ devices in which set top box functionality is integrated with a display.

As suggested by their name, PFs 302 are fiber-optic cables that carry optical signals between CPEs 310 and NID 250. In some embodiments, PFs 302 are implemented with POF, also sometimes referred to as polymer optical fiber. PFs 302 may include a PMMA or acrylic core material and fluorinated polymer cladding material. In other embodiments, PFs 302 may employ perfluorinated polymers including, as an example, polyperfluorobutenylvinylether. PFs 302 may be physically configured where the core accounts for more than 95% of the entire cross section of the fiber. PFs 302 employing POF transmission medium are suitable for use as a relatively low cost, high speed link (e.g., data rate exceeding 1 Gbit/sec over distances of approximately 100 meters) for use within a home or other premises. POF technology is desirable from a cost perspective because the connectors and links and the corresponding installation are relatively inexpensive relative to glass optic-fibers, although perfluorinated POFs are suitable for use in high-speed applications such as data center wiring and building local area network wiring.

In some embodiments, PFs 302 are POF cables and NID 250, and CPEs 310 are configured to transmit and receive 650 nm, single-mode optical signals via PFs 302. In some cases, a CPE 310 may lack a dedicated or integrated POF socket or interface. In these cases, CPE 310 may encompass or include a POF/Ethernet adapter (not depicted). The number of pieces of CPE 310 supported by NID 250 is an implementation detail, but, in some embodiments, NID 250 may be configured for support of sixteen or more CPEs 310.

Figure 4:
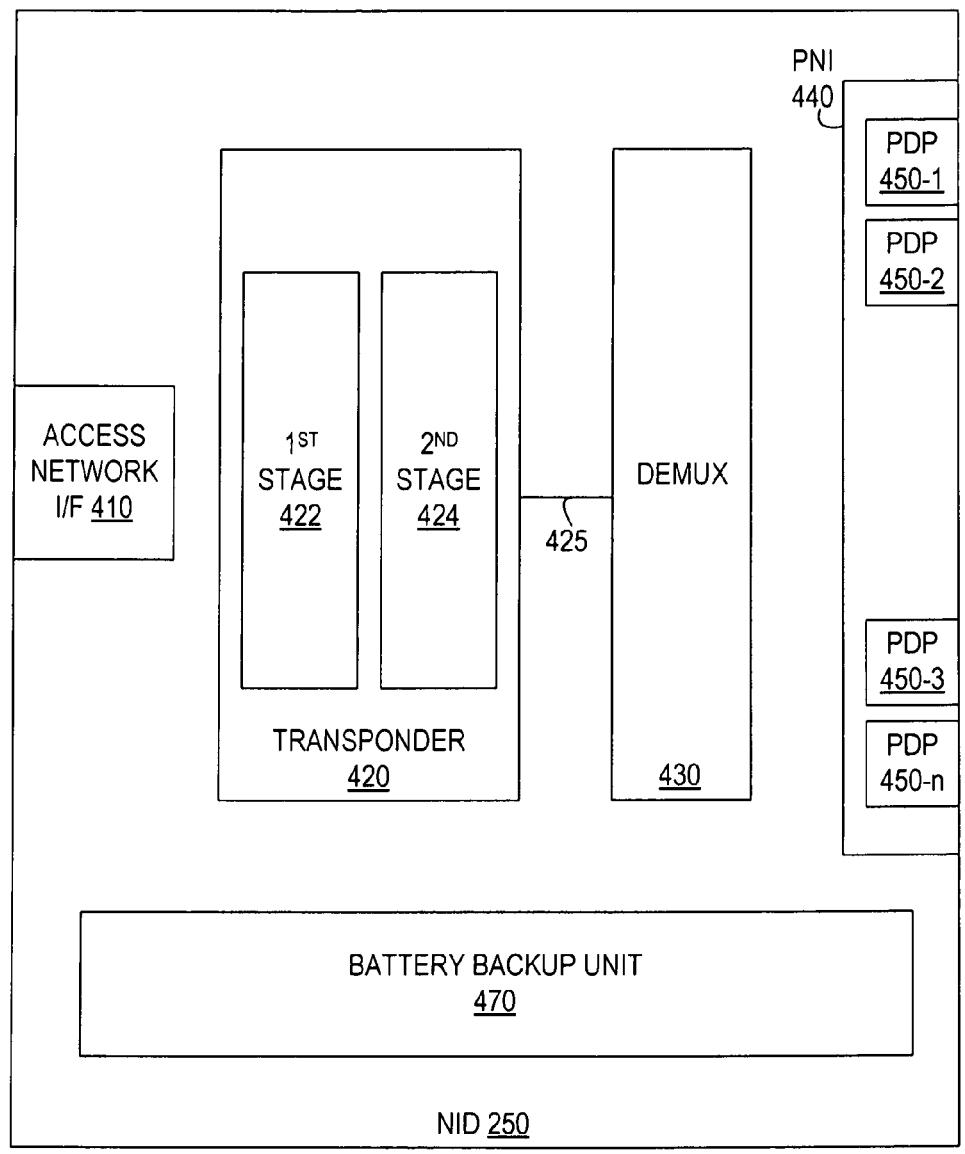
FIG. 4 is a block diagram of selected elements of an embodiment of the network interface device of FIG. 2.

Referring now to FIG. 4, selected elements of an embodiment of NID 250 are depicted. In the depicted embodiment, NID 250 includes an access network interface port (ANIP) 410, a transponder 420, a de-multiplexer 430, and a premises network interface 440 that includes a set of "n" premises device ports 450-1 through 450-n. In addition, the depicted embodiment of NID 250 includes a battery backup unit (BBU) 470 configured to sustain operation of the premises network during a temporary loss of conventional A/C power to the premises.

ANIP 410 is configured to receive an optical signal or electrical signal from LLTM 222 (FIG. 2). In an FTTN configuration of access network 130, LLTM 250 may be a twisted pair copper medium that carries an electrical (i.e., voltage and/or current) signal. The electrical signal may be a broadband electrical signal such as a DSL signal or a VDSL signal. In FTTN environments, where LLTM 222 carries broadband electrical signals, transponder 420 is configured to convert a broadband electrical signal to an optical signal suitable for transmission via PFs 302. Transponder 420 may, for example, represent a transponder configured to convert broadband electric signal such as a VDSL signal to a corresponding optical signal, represented in FIG. 4 by reference numeral 425.

In embodiments employing FTTP access network configurations, ANIP 410 is configured to receive an optical signal via LLTM 222. In these configurations, NID 250 may be configured to convert the optical signal received via LLTM 222 in two stages. For example, transponder 420 may be configured to convert, in a first stage, the optical signal received via LLTM 222 to an electrical signal and to convert, in a second stage, the electrical signal back to an optical signal suitable for de-multiplexing, in de-multiplexer 430, and delivery to CPEs 310 via PFs 302. In these embodiments, the optical signals transmitted via LLTM 222 and the optical signals transmitted via PFs 302 may have different characteristics including different wavelengths, different modalities (e.g., single-mode vs. multi-mode), and so forth. In one embodiment referenced previously, LLTM 222 carries a single-mode, 1310 nm optical signal and PFs 302 carry 650 nm single-mode optical signals. In this embodiment, transponder 420 may include a first stage 422 to convert the single-mode 1310 nm signal to an electrical signal and a second stage 424 to convert the electrical signal to a 650 nm optical signal.

In the FTTP configurations, de-multiplexer 430 may have substantially the same function as in the FTTN configurations, namely, to de-multiplex the optical signal to or from de-multiplexer 430 to a set of one or more individual optical signals or device optical signals for communication with a corresponding CPE 310 via a corresponding device premises port 450 and PF 302.

BBU 470 may include one or more batteries, capacitors, inductors and/or other forms of electrical energy storage devices connected to a switching mechanism that connects the devices to NID circuitry when the supply of conventional A/C or DC power is interrupted. NID 250 may include a transformer and/or a power supply to convert conventional A/C power (e.g., 110 V, 60 Hz "wall" power) to one or more DC supply voltage used to operate NID circuitry. In these cases, BBU 470 may provide DC power directly to the NID circuit when the A/C power supply is interrupted. BBU 470 may further include logic or circuitry for estimating and indicating the amount of deliverable power remaining as well as alarm circuitry for indicating an alarm when the amount of deliverable power remaining drops below a predetermined threshold.

In the embodiment depicted in FIG. 4, in which NID 250 includes multiple premises device ports 450, NID 250 includes an optical de-multiplexer 430 that de-multiplexes the optical signal received via transmission link 425 into a set of one or more optical signals corresponding to one or more of the PFs 302 and the CPEs 310 in SP 270. In some embodiments, optical de-multiplexer 430 de-multiplexes the received optical signal into a set of "n" premises optical signals, where each of the "n" premises optical signals corresponds to one of the CPEs 310.

The premises network interface 440 depicted in FIG. 4 includes a set of "n" premises device ports 450 where each premises device port 450 is configured to receive a PF 302 or other form of optical fiber. In some embodiments, as discussed above, the PFs 302 are implemented with POF transmission media.

Figure 5:
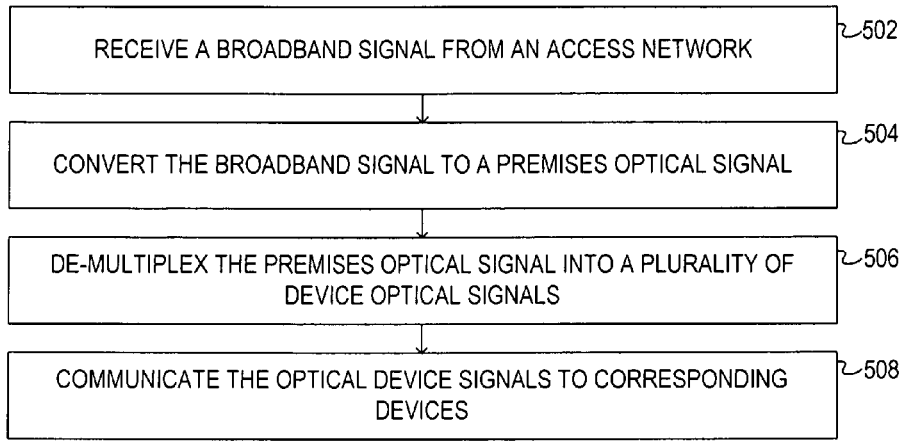
FIG. 5 is a flow diagram of selected elements of a method of providing communication services to a subscriber.

Turning now to FIG. 5, a flow diagram depicts selected elements of a method 500 of providing multimedia communication services to a subscriber. In the depicted embodiment, method 500 includes receiving (block 502) a broadband signal from an access network transmission media. The broadband signal may convey various types of communication information including voice or telephony information, data information including Web-traffic, email, and so forth, and multimedia content distribution including television content, VOD content, PPV content, and the like. The broadband signal may be an electrical signal, such as a VDSL signal, or an optical signal, e.g., a 1310 nm SMF signal. The access network transmission medium may include an electrical conductor suitable for transmitting an electrical broadband signal, e.g., a twisted copper pair transmission medium. The access network transmission medium may include an optical transmission medium such as SMF cables.

Figure 6:
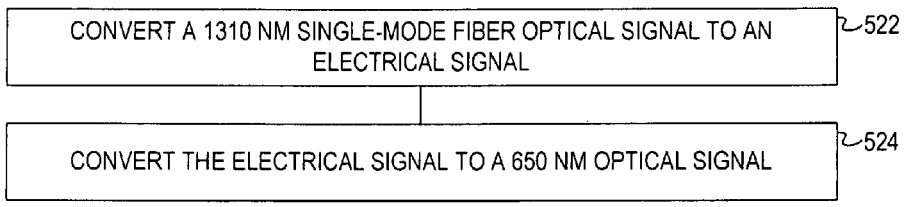
FIG. 6 is a flow diagram depicting selected aspects of an embodiment of the flow diagram of FIG. 5.
Figure 7:
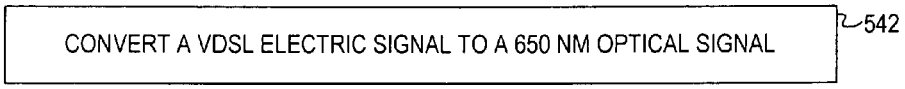
FIG. 7 is a flow diagram depicting selected aspects of an alternative embodiment of the flow diagram of FIG. 5.

Method 500 as shown further includes converting (block 504) the broadband signal to a premises optical signal. FIG. 6 depicts elements of one embodiment of conversion block 504. In the embodiment depicted in FIG. 6, suitable for use in an FTTP environment in which the access network transmission medium delivers an optical signal to the subscriber premises, converting may include a first stage including converting (block 522) a 1310 nm single-mode fiber optical signal to an electrical signal and a second stage including converting (block 524) the electrical signal to a 650 nm optical signal. FIG. 7 depicts an element of one embodiment of conversion block 504 suitable for use in an FTTN environment where the access network transmission medium carries a VDSL signal to the premises. As depicted in FIG. 7, converting 504 includes converting (block 542) a VDSL signal to a 650 nm optical signal.

Returning to FIG. 5, the depicted embodiment of method 500 further includes de-multiplexing (block 506) the premises optical signal into a plurality of optical device signals. In this embodiment, the premises optical signal may contain information corresponding to multiple device optical signals, each individual optical signal associated with a corresponding CPE device. The device optical signals may be de-multiplexed into premises optical signals using any of various de-multiplexing techniques including time division and code division de-multiplexing.

Method 500, as depicted in FIG. 5, further includes communicating (block 508) the device optical signals to corresponding devices via corresponding premises device ports 450 and PFs 302. Method 500 encompasses the operation of NID 250 as described herein. In some embodiments, method 500 may represent or include software instructions, executable by a general purpose, embedded, or application-specific microprocessor or controller, generically referred to herein as a processor. The processor-executable software instructions may be stored in a tangible or non-transitory storage medium accessible to and readable by the processor. The storage medium may be any form of conventional computer storage and/or memory devices including system memory, static memory, flash memory storage, optical storage such as DVD and CD storage, magnetic disk storage and so forth.

Figure 8:
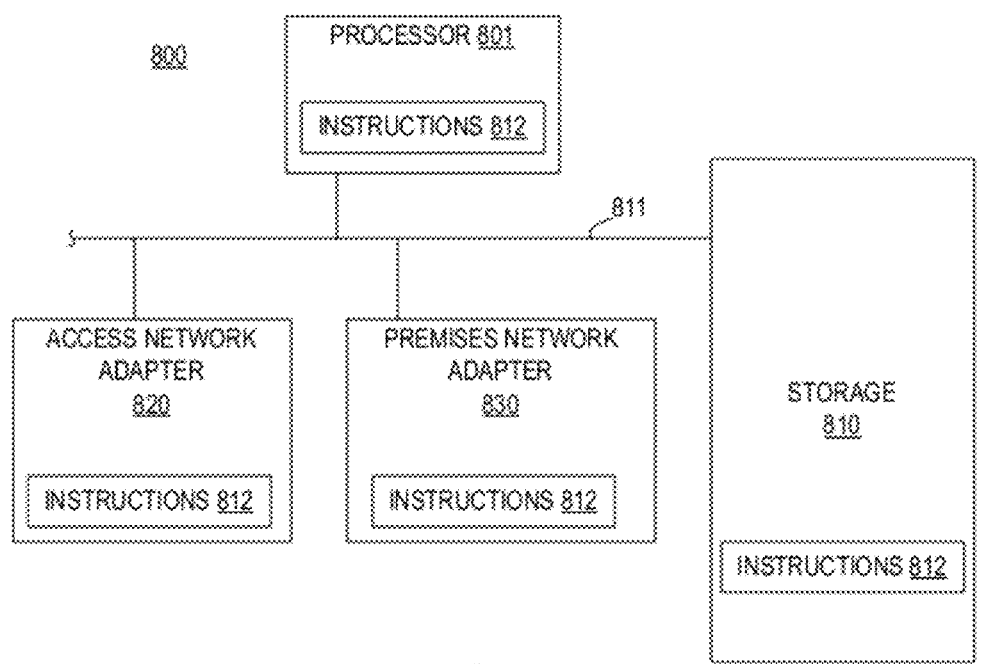
FIG. 8 is a block diagram of selected elements of an exemplary data processing system.

Referring to FIG. 8, selected elements of an embodiment of a data processing apparatus 800 suitable for use in performing all or some of the elements of method 500 as depicted in FIG. 5, FIG. 6, and FIG. 7 are depicted. In the depicted embodiment, data processing apparatus 800 includes a processor 801, computer readable storage medium 810, access network adapter 820, and a premises network adapter 830, all shown as interconnected via a bus 811 that enables each of the elements to access computer readable storage medium 810. Computer readable storage medium 810 is shown with instruction 812, executable by processor 801 and/or other elements of apparatus 800. As shown, each of the depicted elements of apparatus 800 may include all or a portion of instructions 812, executable by processor 801 or other processing elements of apparatus 800, needed to perform functionality including the functionality represented by method 500. For example, instructions 812 may reside in computer readable storage medium 810, which may include flash memory, disk memory, or another form of nonvolatile storage and be retrieved and executed by processor 801 and/or adapters 820 and/or 830 during operation.

Access network adapter 820 and premises network adapter 830 may include, in addition to ports and other interface hardware, instructions 812 for implementing any protocol stacks needed to process the information in signals that traverse the applicable network. Adapters 820 and 830 may further include hardware and/or software needed to perform a physical conversion of optical signals to electrical signals and vice versa. In addition, premises network adapter 830 may further include hardware and/or software to perform de-multiplexing of a set of multiple device optical signals as described above.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A network interface device, comprising:
an access network adapter for receiving a premises specific broadband signal from a multiplexer of an access network node, wherein the premises specific broadband signal includes at least one of: voice information specific to a first subscriber premises and data information specific to the first subscriber premises; and
a bidirectional transponder including:
a first stage to convert the broadband signal to an intermediate electrical signal;
a second stage to convert the intermediate electrical signal to a premises optical signal specific to the particular customer premises, wherein the premises optical signal includes voice information, video information, and data information associated with a plurality of premises devices wherein at least one of the voice information, data information, and video information is specific to the particular premises;
a de-multiplexer to de-multiplex the premises optical signal into a plurality of device optical signals, wherein the plurality of device optical signals includes a voice optical signal indicative of the voice information, a video optical signal indicative of the video information, and a data optical signal indicative of the data information; and
a premises network adapter including a plurality of premises network ports, wherein each premises network port is operable for:
receiving one of the plurality of device optical signals from the de-multiplexer; and
receiving a premises fiber connecting a premises device installed at the customer premises.

2. The network interface device of claim 1, wherein the broadband signal is selected from: a fiber optical signal and a digital subscriber line signal.

3. The network interface device of claim 2, wherein the broadband signal is a single-mode fiber optical signal.

4. The network interface device of claim 3, wherein a wavelength of the single-mode fiber optical signal is a 1310 nm.

5. The network interface device of claim 3, wherein the de-multiplexer employs code division de-multiplexing to generate the plurality of device optical signals.

6. The network interface device of claim 3, wherein the premises fiber comprises a 650 nm plastic optical fiber.

7. The network interface device of claim 1, wherein the broadband signal is an electrical broadband signal.

8. The network interface device of claim 1, further comprising a battery backup unit configured to provide backup power for a predetermined duration in the event of an interruption of power to the premises.

9. A method of providing content, the method comprising:
receiving, by a network interface device corresponding to a first subscriber premises, a premises specific broadband signal from a multiplexer of an access network node wherein the premises specific broadband signal includes at least one of: voice information specific to the first subscriber premises and data information specific to the first subscriber premises;
converting the broadband signal to an intermediate electrical signal;
converting the intermediate electrical signal to a premises-specific optical signal, wherein the premises optical signal includes the voice information, video information, and data information;
de-multiplexing the premises-specific optical signal into a plurality of device optical signals, wherein the plurality of device optical signals includes a voice optical signal indicative of the voice information, a video optical signal indicative of the video information, and a data optical signal indicative of the data information; and
providing, from the network interface device, the device optical signals to corresponding subscriber devices located at the first subscriber premises via corresponding device optical signals.

10. The method of claim 9, wherein the broadband signal is selected from: a fiber optical signal and a digital subscriber line signal.

11. The method of claim 10, wherein the broadband signal is a single-mode fiber optical signal.

12. The method of claim 11, wherein a wavelength of the single-mode fiber optical signal is a 1310 nm.

13. The method of claim 11, wherein de-multiplexing the premises-specific optical signal includes code division de-multiplexing to generate the plurality of device optical signals.

14. The method of claim 11, wherein the providing of the device optical signals to corresponding subscribers devices comprises providing the device optical signals via corresponding premises fibers, wherein the premises fibers comprise a plastic optical fiber.

15. The method of claim 14, wherein the premises fiber comprises a 650 nm plastic optical fiber.

16. The method of claim 11, wherein the broadband signal is an electrical broadband signal.

17. A network interface device, comprising:
a processor; a non-transitory computer readable storage medium accessible to the processor, the storage medium including processor executable instructions that, when executed by the processor, cause the processor to perform operations comprising: receiving, by a premises-specific network interface device corresponding to a first subscriber premises, a premises specific broadband signal from a multiplexer of an access network node wherein the broadband signal includes voice information, video information, and data information wherein at least one of the video information, data information and voice information is specific to the first subscriber premises;
converting the broadband signal to an intermediate electrical signal;
converting the intermediate electrical signal to a premises-specific optical signal, wherein the premises-specific optical signal includes the voice information, video information, and data information;
de-multiplexing the premises-specific optical signal into a plurality of device optical signals, wherein the plurality of device optical signals includes a voice optical signal indicative of the voice information, a video optical signal indicative of the video information, and a data optical signal indicative of the data information; and
providing, from the network interface device, the device optical signals to corresponding subscriber devices located at the first subscriber premises.

18. The network interface device of claim 17, wherein the broadband signal comprises a single-mode fiber signal and wherein a wavelength of the single-mode fiber optical signal is a 1310 nm.

19. The network interface device of claim 17, wherein a wavelength of the broadband signal and a wavelength of the premises-specific optical signal are different.

20. The network interface device of claim 17, wherein providing the device optical signals to corresponding subscriber devices comprises providing the device optical signals to the corresponding subscriber devices via corresponding premises fibers, wherein the premises fiber comprises a 650 nm plastic optical fiber.

* * * * *